United States Patent
Detrick (10) Patent No.: US 11,605,064 B2
(45) Date of Patent: Mar. 14, 2023

(54) PAYMENT PROCESSING AND MESSAGING SYSTEM FOR AN UNATTENDED KIOSK

(71) Applicant: Innovative Control Systems, Inc., Wind Gap, PA (US)

(72) Inventor: Kevin Detrick, Nazareth, PA (US)

(73) Assignee: INNOVATIVE CONTROL SYSTEMS, INC., Wind Gap, PA (US)

( * ) Notice: Subject to any disclaimer, the term of this patent is extended or adjusted under 35 U.S.C. 154(b) by 0 days.

(21) Appl. No.: 16/817,123

(22) Filed: Mar. 12, 2020

(65) Prior Publication Data

US 2020/0294020 A1    Sep. 17, 2020

Related U.S. Application Data

(60) Provisional application No. 62/817,466, filed on Mar. 12, 2019.

(51) Int. Cl.
G06Q 20/20    (2012.01)

(52) U.S. Cl.
CPC ......... *G06Q 20/204* (2013.01); *G06Q 20/209* (2013.01)

(58) Field of Classification Search
CPC ............................ G06Q 20/204; G06Q 20/209
See application file for complete search history.

(56) References Cited

U.S. PATENT DOCUMENTS

| | | | | |
|---|---|---|---|---|
| 9,037,491 | B1* | 5/2015 | Lee | G06Q 20/34 705/17 |
| 2011/0199308 | A1* | 8/2011 | Nativel | G06Q 20/18 345/168 |
| 2011/0238581 | A1* | 9/2011 | Severson | G06Q 20/367 705/65 |
| 2017/0192840 | A1* | 7/2017 | Jeansonne | G06F 11/0793 |
| 2018/0032975 | A1* | 2/2018 | Wolter | G06Q 20/085 |
| 2018/0341935 | A1* | 11/2018 | Lindfeldt | H04W 4/00 |

* cited by examiner

*Primary Examiner* — A. Hunter Wilder
*Assistant Examiner* — Joseph M Mutschler
(74) *Attorney, Agent, or Firm* — Troutman Pepper Hamilton Sanders LLP (57) ABSTRACT

A point-of-sale system has a card reader, a point-of-sale device, and an intermediate processing module configured to communicate with the card reader and the point-of-sale device. The card reader has a card reader module configured to receive information from a payment card. The point-of-sale device has a POS display and a POS module. The intermediate processing module is configured to receive status information from the card reader module, generate a message associated with the status information, and provide the message to the POS module for presenting on the POS display.

15 Claims, 6 Drawing Sheets

PAYMENT PROCESSING AND MESSAGING SYSTEM FOR AN UNATTENDED KIOSK

CROSS REFERENCE TO RELATED APPLICATIONS

This application claims the benefit of priority of U.S. Provisional Patent Application Ser. No. 62/817,466, filed on Mar. 12, 2019, entitled "Payment Processing and Messaging System for an Unattended Kiosk," the entire contents of which are hereby incorporated by reference herein.

TECHNICAL FIELD

The present disclosure relates generally to payment processing, and, more particularly, to a payment processing and messaging system for an unattended kiosk.

BACKGROUND

Some point-of-sale of devices are built with a touch screen to present various service and purchase options. Unattended kiosks also offer a small display built into the card reader. The customer may be prompted to interact with the card reader to complete the transaction. Prompts and error messages are displayed on the small card reader LCD. Since the customer focus is on the larger kiosk display, the prompts and error messages may go unnoticed. The transaction may time out and fail. The present disclosure relates to overcoming this and other problems of the prior art.

SUMMARY

According to some aspects, the present disclosure includes embodiments of a point-of-sale system. The point-of-sale system includes a card reader including a card reader module configured to receive information from a payment card, a point-of-sale device comprising a POS display and a POS module, and an intermediate processing module configured to communicate with the card reader module and the POS module. The intermediate processing module is also configured to receive status information from the card reader module, generate a message associated with the status information, and provide the message to the POS module for presenting on the POS display.

According to some other aspects, the present disclosure includes embodiments of a computer-implemented method. The method includes receiving, at a card reader module, information from a payment card, determining, by the card reader module, status information based on the information from the payment card, and receiving, at an intermediate processing module, the status information from the card reader module. The method also includes generating, by the intermediate processing module, a message associated with the status information, and providing, by the intermediate processing module, the message to a POS module for presenting on a POS display.

According to still other aspects, the present disclosure includes embodiments of another computer-implemented method for routing transaction messages to a point-of-sale device comprising a POS display. The method includes receiving, at an intermediate processing module, an authorization request from a POS module of the point-of-sale device, delivering, by the intermediate processing module, the authorization request to a card reader module of a card reader, receiving, at an intermediate processing module, status information of a transaction from the card reader module, generating, by the intermediate processing module, a message associated with the status information, and providing, by the intermediate processing module, the message to the POS module for presenting on the POS display.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

The present disclosure describes a system configured to identify various states of a card reader, including prompts and error codes, and send messages to a point-of-sale (POS) device display instead of or in addition to a card reader display. An intermediate processing module between the POS device and the card reader analyzes information from the card reader and provides appropriate messages to the POS device display. In this way, the POS device assists the customer through a payment process. If the card is swiped instead of dipped, removed early, unreadable, etc., the error or instruction is translated by the intermediate processing module and sent to the POS device to present corrective action to the customer.

The messages that are returned back to the unattended POS system make it easy for the consumer to use the system, without having to view two different screens. The following are examples of messages that may be forwarded to the POS display:

Insert Card
Enter PIN
Processing
Card Read Errors
Any other user prompts displayed on the card reader display The disclosed POS system is configured to translate status or error codes from a card reader device into helpful instructions that are convenient to a user. For example, where a card reader display may simply present "Error" to a user, an intermediate processing module may translate the particular error code to indicate that the user should try swiping the card instead of inserting it. Moreover, status codes that may not be normally presented to a user on a card reader display, such as "processing" may be displayed to a user through the POS device display, informing the user that their payment is in process.

Figure 1:
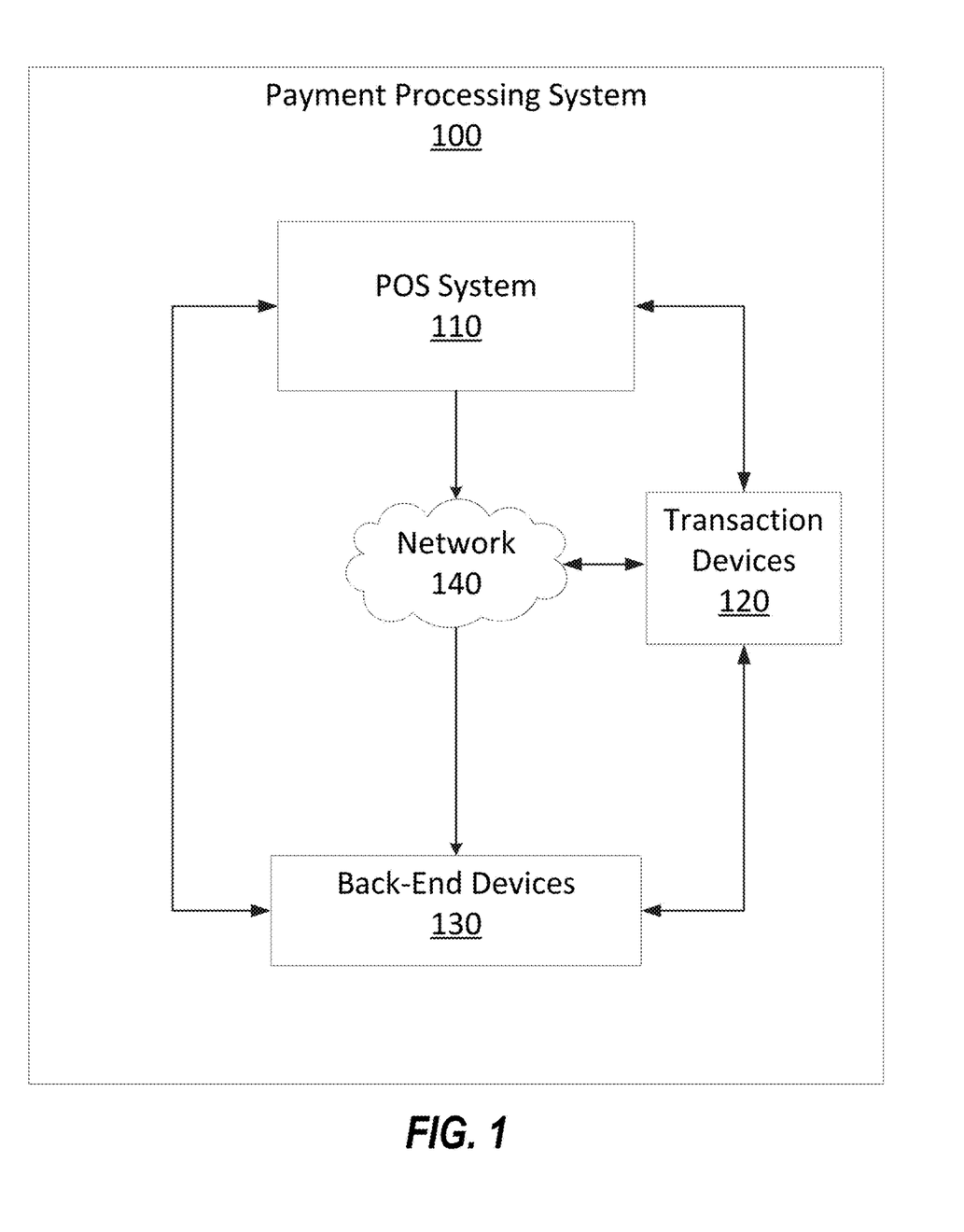
FIG. 1 is a block diagram of an exemplary payment processing system, according to an embodiment.

FIG. 1 is an illustration of an exemplary payment processing system 100. The payment processing system 100 may include a POS system 110, one or more transaction devices 120, and one or more back-end devices 130. A network 140 may connect the POS system 110, the transaction devices 120, and/or the back-end devices 130.

The POS system 110 may be one or more computing devices including one or more processors configured to execute software instructions stored in one or more memory devices. The POS system 110 may include components that enable disclosed functions for processing POS services and purchases. The transaction devices(s) 120 may be computing devices configured to perform transaction processing. For example, transaction device(s) 120 may be associated with a credit card gateway and/or processer configured to handle transaction authorization, token generation, gift card processing, etc. The back-end device(s) 130 may be computing devices configured to provide back-end transaction services. For example, the back-end device(s) 130 may be associated with banks, card issuers, credit/debit network, automated clearing houses, etc. The network 140 may be a local or global network and may include wired and/or wireless components and functionality which enable internal and/or external communication for components of payment processing system 100. The network 140 may be embodied by the Internet, provided at least in part via cloud services, and/or may include one or more communication devices or systems which enable data transfer to and from the systems and components of the payment processing system 100.

Figure 2:
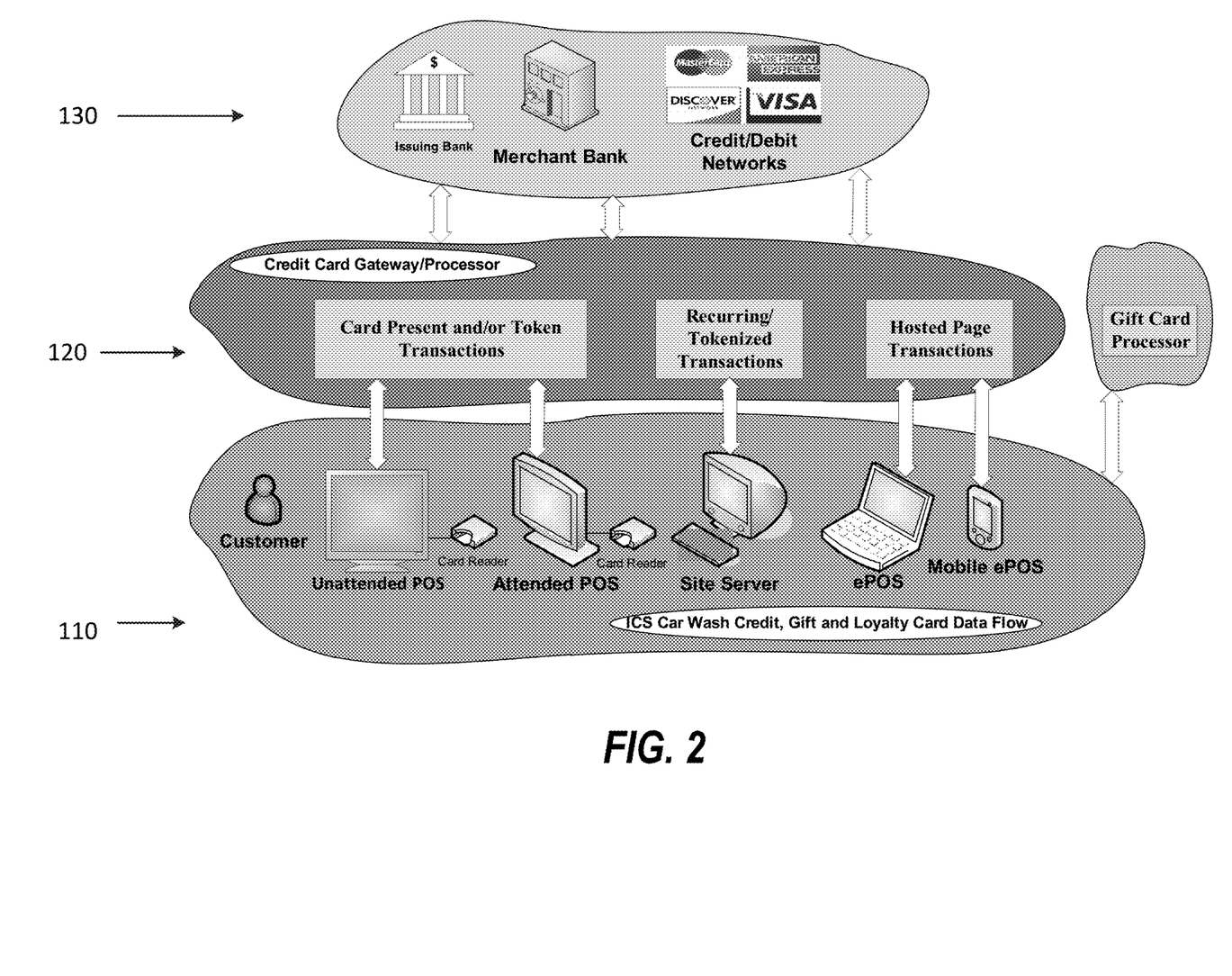
FIG. 2 is an exemplary system architecture associated with the payment processing system, according to an embodiment.

FIG. 2 is an exemplary system architecture associated with payment processing system 100. The system includes exemplary configurations of the POS system 110, transaction devices 120, and back-end devices 130. In the POS system 110, devices such as an unattended POS device, attended POS device, site server, electronic POS, and mobile POS may be included. The unattended POS lets customers purchase and pay by credit, gift or cash payment. The attended POS is a device associated with a cashier that greets the customer and helps customers purchase and pay by credit, gift or cash payment. The electronic POS may be a specific website where customers purchase services and pay by credit card or card on file. The mobile POS may be the mobile version of the electronic POS. The site server may be a server installed at the retail location where tokenized (recurring) transactions are processed by the transaction level devices application.

Figure 3:
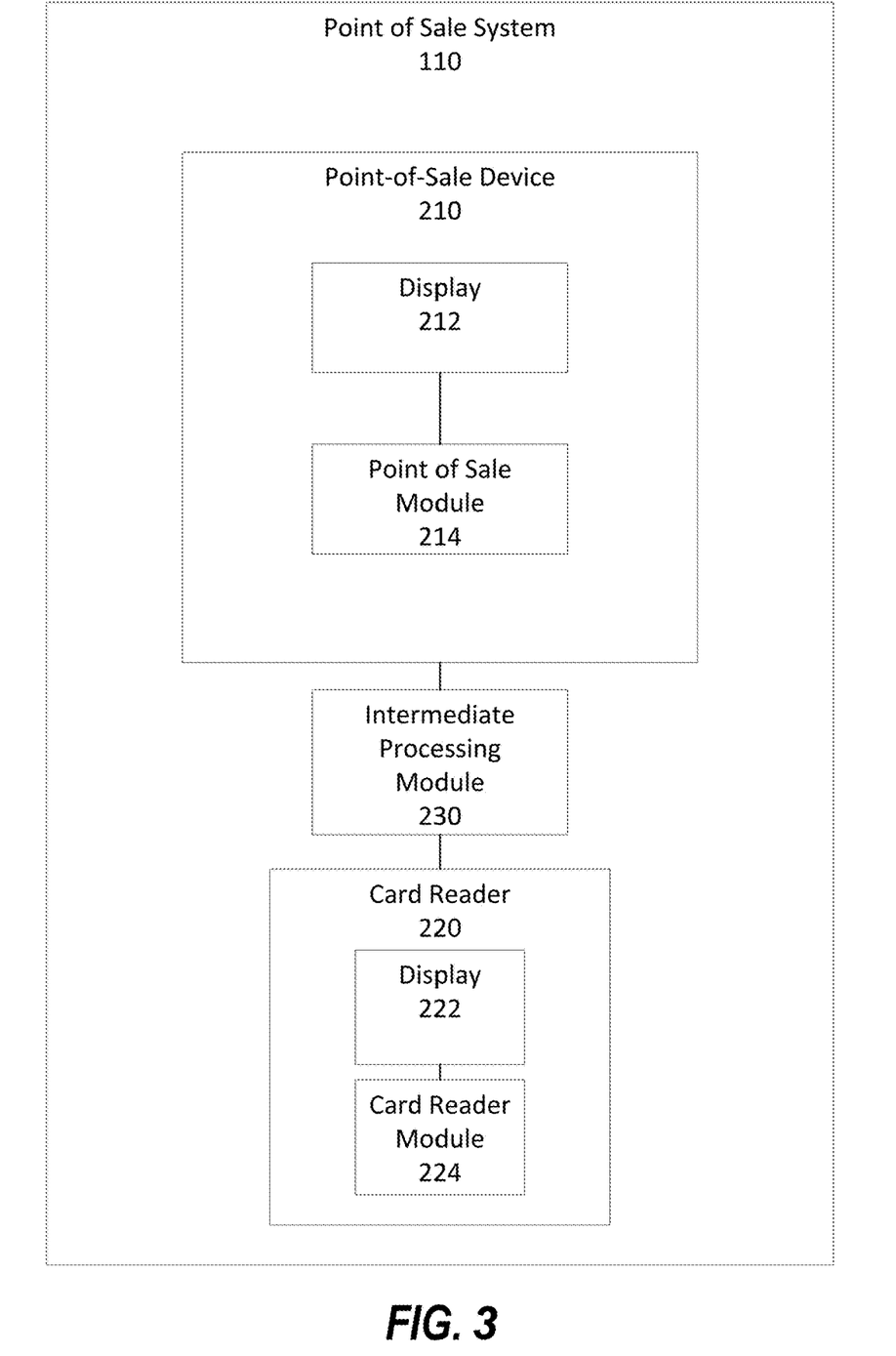
FIG. 3 is a block diagram of an exemplary point-of-sale system, according to an embodiment.

FIG. 3 is an exemplary embodiment of a POS system 110. In an exemplary embodiment, the POS system 110 is associated with an unattended kiosk. The unattended kiosk may be associated with a car wash service. For example, a customer may drive up to the unattended kiosk, select car wash services using an interactive screen, and provide payment without interacting with an attendant. Other examples of services that may use an unattended kiosk include: check-in services, rental services, retail check-out services, parking services, ticketed services, or any services that involve or may accommodate unattended payment.

The POS system 110 may include a point-of-sale device (POS device) 210. The POS device 210 may include a display 212 and a point-of-sale module (POS module) 214. The display 212 may be an interactive display configured to provide options to a user for receiving services. For example, the display 212 may display car wash service options. The display 212 may be a touch screen. The POS module 214 may be software and/or hardware and be configured to display information via the display 212 and receive input from the display 212 (or other associated I/O device).

The POS system 110 may further include a card reader 220. The card reader 220 may include card reader hardware, such as a pin pad, slot for swiping/inserting a credit or debit card, etc. The card reader 220 may further include a display 222 and a card reader module 224. The display 222 may be optional, but may be a conventional feature of a card reader. The card reader module 224 may be software and/or hardware and configured to receive information from the card reader hardware (e.g., information from an inserted car and/or pin pad input). In this way, the card reader 220 may receive information from a payment card (e.g., a credit or debit card inserted into the card reader 220, or through other payment options, such as those enabled by Bluetooth or NFC (e.g., payments made by smart phone). The card reader module 224 may perform payment processing tasks, including authorization/pre-authorization of a payment by communicating with transaction devices 120 via network 140. The card reader module 224 may be further configured to identify a state or status of the card reader 220, such as by producing a status or error code.

The POS system 110 may further include an intermediate processing module 230. The intermediate processing module 230 may be software and/or hardware and be configured to be a communication point between the POS module 214 and the card reader module 224. The intermediate processing module 230 may be configured to receive information from the card reader module 224, such as one or more status or error codes, and provide information to the POS module 214 that can be displayed to a customer through the display 212.

Figure 4:
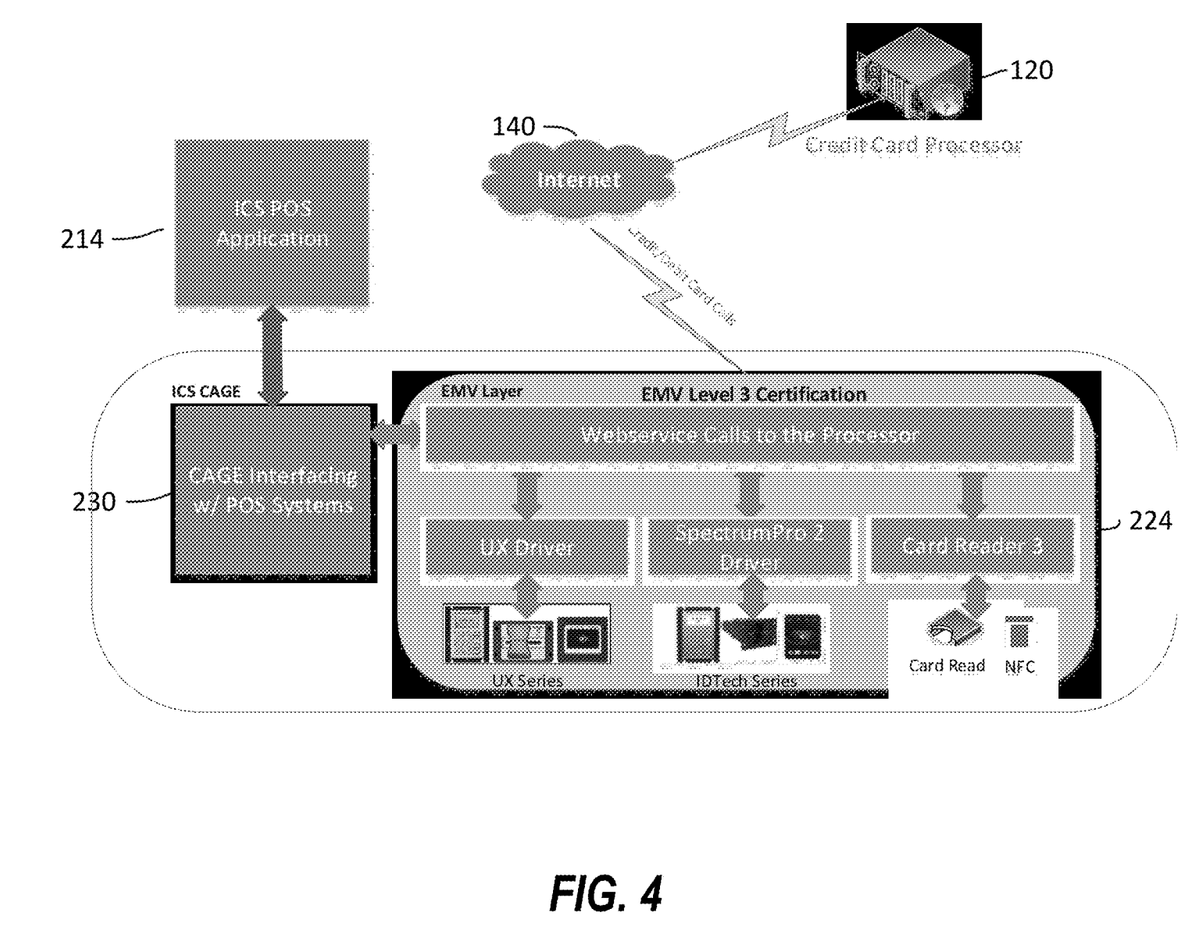
FIG. 4 is an exemplary system architecture associated with the point-of-sale system, according to an embodiment.

FIG. 4 is an exemplary system diagram for a POS system 110, according to an embodiment. The intermediate processing module 230 sits between the card reader module 224 and the POS module 214. The intermediate processing module 230 is configured to generate messages based on information from the card reader module 224 and selectively provide messages to the POS module 214 for displaying to a user.

According to some embodiments, the messages are related to a transaction at an unattended kiosk, such as a car wash station. The intermediate processing module 230 may be configured to receive messages associated with status information for the transaction. In some embodiments, the intermediate processing module 230 may receive a message identifier in a first code format, such as the following format "MSG_NEW_XXXXX." Examples include:

MSG_NEW_AMOUNT
    MSG_NEW_AMOUNT_OK
    MSG_NEW_APPROVED
    MSG_NEW_CALL_YOUR_BANK
    MSG_NEW_CANCEL_OR_ENTER
    MSG_NEW_CARD_ERROR
    MSG_NEW_DECLINED
    MSG_NEW_ENTER_AMOUNT
    MSG_NEW_ENTER_PIN
    MSG_NEW_INCORRECT_PIN
    MSG_NEW_INSERT_SWIPE_CARD
    MSG_NEW_CARD The intermediate processing module 230 may be configured to translate the received message identifier into a second format, such as a user output format for display to a user. The message to be displayed in the user output format may be determined in part based on a selected language according to device settings. Examples of messages in the second format include:

AMOUNT:
AMOUNT OK?
APPROVED
CALL YOUR BANK
CANCEL OR ENTER
CARD ERROR
DECLINED
ENTER AMOUNT
PLEASE ENTER PIN
INCORRECT PIN
INSERT/SWIPE CARD
CARD
INSERT CARD
USE CHIP READER
NOT ACCEPTED
GET PIN OK
PLEASE WAIT . . .
PROCESSING ERROR
USE MAGSTRIPE
TRY AGAIN
AUTHORIZING . . .
TRANSACTION ERROR
TERMINATED
ADVICE
TIMEOUT
PROCESSING . . .

Figure 5:
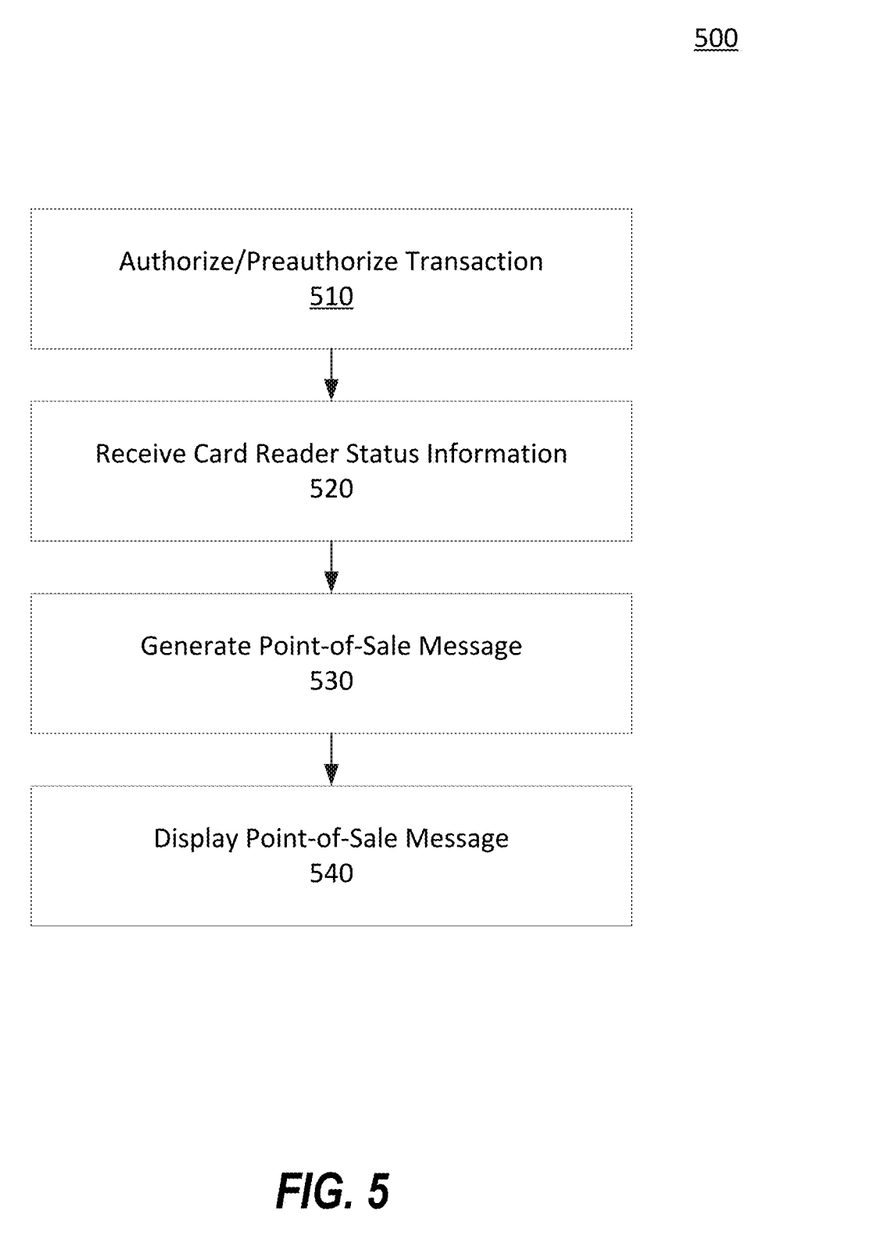
FIG. 5 is a flowchart of an exemplary processing and messaging process, according to an embodiment.

FIG. 5 is a flowchart of an exemplary process 500 for transaction processing. In an exemplary embodiment, the process 500 may be performed by the POS system 110. In one embodiment, the process 500 includes authorization and/or pre-authorization of a transaction (step 510). This step may include the card reader module 224 receiving information from and/or associated with a payment card or account (e.g., card number, pin number, expiration date, etc.). The card reader module 224 may process the information and produce one or more status or error codes associated with the transaction. For example , the card reader module 224 may produce an instruction for the user to remove their card, swipe their card, reinsert their card. In another example, the card reader module 224 may produce a status code indicating that the transaction is processing, being authorized, was rejected, is complete, etc. The intermediate processing module 230 may receive card reader status information (step 520). The card reader status information may include the one or more status or error codes associated with the transaction. The status or error code may be in the form of a code (e.g., error-11, e-2, 3423423, etc.) or may be the text of a status or error (e.g., error—reinsert card, payment processing, transaction complete, etc.), or in another form, depending on the configuration of the card reader 220. For instance, different card reader hardware suppliers may have different error or status code formats.

The intermediate processing module 230 may generate a message associated with the card reader status information (step 530). For example, the intermediate processing module 230 may translate a status or error code into a message or instruction. In one example, the intermediate processing module 230 may receive an error code associated with an unreadable card and produce an instruction for the user to try again by re-inserting their card. In another example, a status code may indicate that the card reader is waiting for the customer to enter their PIN. The intermediate processing module 230 may translate the status code into the instruction "Please Enter PIN."

The intermediate processing module 230 may provide the generated message to the POS module 214 for being presented on the display 212. For example, the instruction translated by the intermediate processing module 230 may be received by the POS module 214 and sent to the display 212 for presenting to the customer to assist the customer through the payment process.

Figure 6:
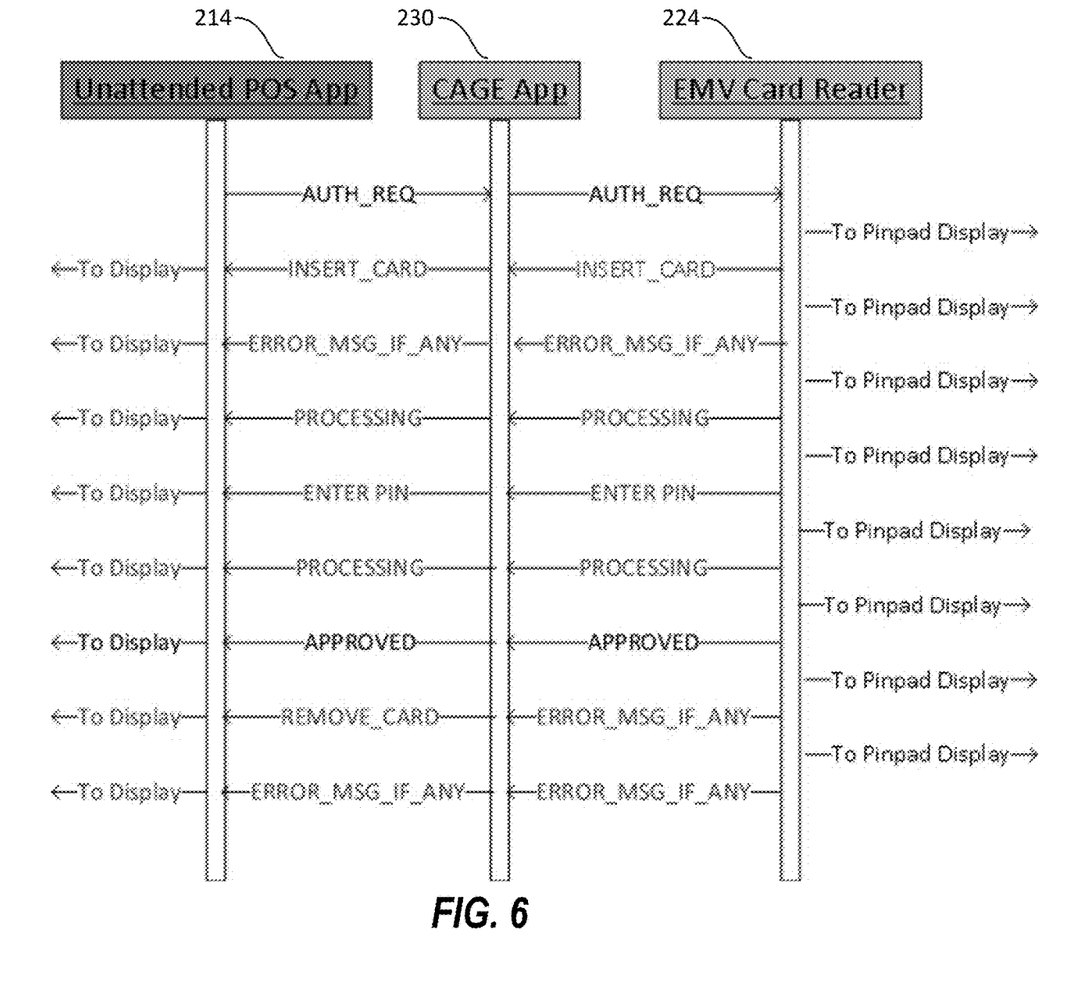
FIG. 6 is an exemplary decisioning chart associated with the processing and messaging processing, according to an embodiment

FIG. 6 is a chart of an exemplary process flow between the POS module 214, intermediate processing module 230, and card reader module 224. As shown, after authorization by the card reader module 224, generated error or status codes may be sent to the intermediate processing module 230, which are translated and forwarded to the POS module 214 for displaying to the customer through the POS display 212. The card reader display 222 may optionally also display one or more messages, as it would in a conventional system.

The intermediate processing module provides additional functionality over previous systems in that status information is provided to a POS display, which may be a primary display that is receiving the most attention from the customer. Instead of looking at the POS display to complete a sale and missing information that would normally only be presented on a card reader display, the present disclosure provides a mechanism for directing this information to the customer on the POS display. Moreover, the intermediate processing module provides an opportunity to translate error or status codes into more convenient messages and instructions, including messages or instructions that might not otherwise be presented on the card reader display. In this way, a seamless and efficient POS experience may be presented to a user.

Embodiments of the present disclosure may be implemented as computer-implemented methods in a computing system, such as a point-of-sale system. As described herein, the point-of-sale system may include processing, memory, and input/output components for implementing the disclosed methods in a practical application of the disclosed features to enhance the point-of-sale system and notify users at a point-of-sale display regarding interaction with a separate card reader. For instance, the processing component and/or the input/output components may execute software instructions stored in a memory component to carry out one or more steps of the methods described herein.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. The system, components, and processes of the figures are not exclusive. Other systems, components, and processes may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention.

The invention claimed is:

1. A payment processing and messaging system for an unattended kiosk, comprising:
    a card reader comprising:
        a card reader module configured to receive information from a payment card, and
        a card reader display;
    an unattended point-of-sale device comprising a POS display and a POS module; and an intermediate processing module configured to communicate with the card reader module and the POS module and further configured to:
  receive status information, in a first format, from the card reader module, wherein the status information comprises at least one of a status of a payment transaction or an error representing a requirement to complete the payment transaction;
  suppress display of the status information in the first format at the card reader display in response to receiving the status information;
  generate an instruction for a user to take an action in response to the status information in a second format that is understandable by users in response to receiving the status information, wherein the message is not presented on the card reader display; and
  provide the message to the POS module for presenting on the unattended POS display in response to generating the instruction for the user to take.

2. The payment processing and messaging system of claim 1, wherein the intermediate processing module is configured to receive an authorization request from the POS module and deliver the authorization request to the card reader module, and wherein the card reader module suppresses display of the instruction at the card reader display based on the receipt of the authorization request from the card reader module.

3. The payment processing and messaging system for an unattended kiosk of claim 1, wherein the status of a payment transaction comprises one of: processing, authorizing, approved, rejected, declined, terminated, completed, and timeout.

4. The payment processing and messaging system for an unattended kiosk of claim 1, wherein the requirement comprises one of: an insertion a payment card, a swiping the payment card; a use of a chip reader; an entering of a PIN, an entering of an amount, and a confirmation of the amount.

5. The payment processing and messaging system for an unattended kiosk of claim 1, wherein action comprises one of: inserting a payment card, swiping the payment card, using a chip reading, entering a PIN, entering an amount, and confirming the amount.

6. A computer-implemented method for use with a card reader, the card reader comprising a card reader module and a card reader display, comprising:
  receiving, at the card reader module, information from a payment card;
  determining, by the card reader module, status information based on the information from the payment card, wherein the status information is in a first format and comprises at least one of a status of a payment transaction or an error representing a requirement to complete the payment transaction;
  receiving, at an intermediate processing module, the status information from the card reader module;
  suppressing display of the status information in the first format at the card reader display in response to receiving the status information;
  generating, by the intermediate processing module, an instruction for a user to take an action in response to the status information in a second format that is understandable by users, wherein the instruction is not presented on the card reader display; and
  providing, by the intermediate processing module, the instruction to a POS module for presenting on an unattended POS display in response to generating the instruction for the user to take.

7. The method of claim 6, further comprising:
  receiving, at the intermediate processing module, an authorization request from the POS module; and
  delivering, by the intermediate processing module, the authorization request to the card reader module,
  wherein the card reader module suppresses display of the instruction at the card reader display based on the receipt of the authorization request from the card reader module.

8. The method of claim 6, wherein the status of a payment transaction comprises one of: processing, authorizing, approved, rejected, declined, terminated, completed, and timeout.

9. The method of claim 6, wherein the requirement comprises one of: an insertion a payment card, a swiping the payment card; a use of a chip reader; an entering of a PIN, an entering of an amount, and a confirmation of the amount.

10. The method of claim 6, wherein action comprises one of: inserting a payment card, swiping the payment card, using a chip reading, entering a PIN, entering an amount, and confirming the amount.

11. A computer-implemented method for routing transaction messages to an unattended point-of-sale device comprising a POS display, the method comprising:
  receiving, at an intermediate processing module, an authorization request from a POS module of the point-of-sale device;
  delivering, by the intermediate processing module, the authorization request to a card reader module of a card reader, the card reader further comprising a card reader display;
  receiving, at an intermediate processing module, status information of a transaction in a first format from the card reader module, wherein the status information comprises at least one of a status or an error representing a requirement to complete the transaction;
  suppressing display of the status information in the first format at the card reader display in response to receiving the status information;
  generating, by the intermediate processing module, an instruction for a user to take an action in response to the status information in a second format that is understandable by users, wherein the instruction is not presented on the card reader display; and
  providing, by the intermediate processing module, the instruction to the POS module for presenting on the unattended POS display in response to generating the instruction for the user to take.

12. The method of claim 11, wherein generating the instruction comprises the intermediate processing module performing a table lookup process.

13. The method of claim 11, wherein the status of a payment transaction comprises one of: processing, authorizing, approved, rejected, declined, terminated, completed, and timeout.

14. The method of claim 11, wherein the requirement comprises one of: an insertion a payment card, a swiping the payment card; a use of a chip reader; an entering of a PIN, an entering of an amount, and a confirmation of the amount.

15. The method of claim 11, wherein action comprises one of: inserting a payment card, swiping the payment card, using a chip reading, entering a PIN, entering an amount, and confirming the amount.

* * * * *